(12) United States Patent  
Hall

(10) Patent No.: US 8,696,893 B2  
(45) Date of Patent: *Apr. 15, 2014

(54) WATER ENHANCEMENT SYSTEM

(76) Inventor: David Hall, Manti, UT (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/560,441

(22) Filed: Jul. 27, 2012

(65) Prior Publication Data

US 2012/0292234 A1 Nov. 22, 2012

Related U.S. Application Data

(63) Continuation of application No. 12/470,383, filed on May 21, 2009, now Pat. No. 8,252,172.

(51) Int. Cl.
*B01D 35/143* (2006.01)
*B01D 29/56* (2006.01)

(52) U.S. Cl.
USPC ............... 210/87; 210/97; 210/199; 210/223; 210/232; 210/335; 222/129; 222/135; 222/189.06; 222/189.08

(58) Field of Classification Search
USPC .......... 210/87, 97, 198.1, 201, 202, 203, 232, 210/259, 335, 435, 449, 222, 223, 695, 210/199; 426/72–74, 590; 99/275, 279, 99/323, 323.2; 222/189.06, 189.08, 190, 222/129, 131, 135, 144.5
See application file for complete search history.

(56) References Cited

U.S. PATENT DOCUMENTS

| | | | |
|---|---|---|---|
| 2,566,371 A * | 9/1951 | Quinn ........................... | 210/232 |
| 5,468,373 A * | 11/1995 | Chou .............................. | 210/94 |
| 5,543,056 A | 8/1996 | Murcott et al. | |
| 5,895,570 A * | 4/1999 | Liang ............................ | 210/232 |
| 5,922,378 A | 7/1999 | Kagan et al. | |
| 6,056,872 A * | 5/2000 | Glass ............................. | 210/223 |
| 6,250,346 B1 * | 6/2001 | Castillo ......................... | 141/100 |
| 6,308,860 B2 * | 10/2001 | Eagle ............................ | 221/131 |
| 6,312,595 B1 | 11/2001 | Chien | |
| 6,652,893 B2 | 11/2003 | Berson | |
| 6,827,874 B2 | 12/2004 | Souter et al. | |
| 7,115,297 B2 | 10/2006 | Stillman | |
| 7,229,561 B1 | 6/2007 | Hamanaka et al. | |
| 7,476,314 B2 | 1/2009 | Reid | |
| 7,713,482 B2 | 5/2010 | Rinker et al. | |
| 8,252,172 B2 * | 8/2012 | Hall ............................... | 210/87 |
| 2004/0055948 A1 | 3/2004 | Blum et al. | |
| 2005/0258082 A1 | 11/2005 | Lund et al. | |
| 2008/0020096 A1 | 1/2008 | Blum et al. | |

\* cited by examiner

*Primary Examiner* — Joseph Drodge
(74) *Attorney, Agent, or Firm* — JP Webb; Jason P. Webb; Danny Y. H. Cheng

(57) ABSTRACT

There is a water enhancement system coupled to a water conduit, wherein the water enhancement system is configured to enhance a water supply. The water enhancement system includes a filtration system coupled to a water conduit, configured to filter water flowing therethrough. The water enhancement system also includes an enhancement system coupled to the filtration system, configured to treat water flowing therethrough by dispensing a fluid therein. The enhancement system includes a plurality of cartridge sockets and matching cartridges configured to selectably couple together and contain enhancing fluid. The water enhancement system further includes a treatment bracket coupled about the water conduit and to the enhancement system. The water enhancement system additionally includes a treatment device coupled about the treatment bracket and configured to alter a characteristic of the water flowing therethrough.

15 Claims, 4 Drawing Sheets

WATER ENHANCEMENT SYSTEM

CROSS-REFERENCE TO RELATED APPLICATIONS

This application is a Continuation Application of, under 35 U.S.C. §121, and claims priority to, under 35 U.S.C. §121, United States Non-Provisional application Ser. No. 12/470,383, entitled Water Enhancement System, by David Hall, filed on May 21, 2009 now U.S. Pat. No. 8,252,172.

BACKGROUND OF THE INVENTION

1. Field of the Invention

The present invention relates to filtration systems, specifically to a water enhancement system.

2. Description of the Related Art

A water filter is a device which removes impurities from water by means of a fine physical barrier, chemical process and/or biological process. Filters are used to cleanse water for irrigation, drinking water, aquariums, and swimming pools. Water can be cleaned using a variety of different types of water filter, both for drinking and other purposes. Filtration forms a key stage in many waste water and drinking water treatment systems. In the case of drinking water, filtration tends to be carried out by the supplier prior to the water's entry into the distribution system. Additional filtration may be carried out by consumers at their premises using any of several types of domestic water filter.

Domestic water filters are primarily used to remove chemicals and metals such as chlorine and lead. Water filters can be used for preventative health reasons in the case of harmful substances, or for reasons of aesthetics, to improve the taste, color or odor of drinking water. Domestic water filters can be attached directly to a tap, attached to the domestic water supply before the tap. A number of different filter types are available for use in the home; including granular activated carbon filters (GAC), metallic alloy filters, micro porous ceramic filters, carbon block resin (CBR) and ultra-filtration membranes. Some filters units may be composite systems comprising several of these filter technologies. Fitted to the main line in your house. Jug filters can be used for small quantities of water for drinking. Some kettles have such filters built in, predominantly to reduce the effects of lime scale.

Water filters are also used by recreational hikers, by aid organizations during humanitarian emergencies, and by the military. These filters are usually small, portable and light (1-2 pounds or less) and usually filter water by working a mechanical hand pump, although some use a siphon drip system to force water through while others are built right into water bottles. Dirty water is pumped via a screen-filtered flexible silicon tube through a specialized filter, ending up in a container. These types of filters work to remove bacteria, protozoa and microbial cysts, all of which can cause disease. Filters include fine meshes, which must be replaced, and ceramic water filters which must have their outside abraded off when it becomes clogged with impurities. These water filters should not be confused with devices or tablets that are water purifiers. Water purifiers satisfy higher EPA standards, and also remove or kill viruses such as hepatitis A and rotavirus. In a domestic emergency, where water needs will last beyond those of stored, bottled water, a device that is specifically certified as a water purifier, and not a water filter, is preferred. Some improvements have been made in the field. Examples of references related to the present invention are described below, and the supported teachings of each reference are incorporated by reference herein:

U.S. Pat. No. 7,115,297, issued to Stillman, discloses a shelf-stable, ready to use, water-like composition for humans/animals; as an adjunct to fiber-water, and/or safe drinking water, consumed directly, tube feedings, or in the preparation/reconstitution of food(s)/beverage(s). Fortified Fiber-Water is fiber-water, with added delivery systems: Encapsulations/particles, of different size(s), shape(s), material(s), colors, non-visible, serving one or more functions: improved taste, odor-masking; controlled release applications; bio-availability of actives, avoid hygroscopicity; minimized interactions, improved thermal, oxidative, and shelf-life; decorative. Viscosity changing elements, (with one or more viscosity changing additives, with or without encapsulations, particles) to enhance delivery of active medicants/ingredients of categories: pharmaceuticals, nutraceuticals, dietary supplements, therapeutics, diagnostics, etc. Composition ensures hydration, simultaneously providing soluble fiber (fiber-water), with additives contained within the delivery systems, having the ability to target specific health goals/needs: weight loss, diabetes, cholesterol/heart, gastrointestinal tract disorders/improvement, osteoporosis, cancer, pain, stress, relaxant, stimulant etc.

U.S. Pat. No. 6,827,874, issued to Souter et al., discloses compositions, methods and kits for purifying, clarifying nutrifying and any combination thereof, contaminated drinking water, which contain a primary coagulant material and a bridging flocculent material. The levels and ratios of coagulant to flocculent preferably fall within certain ranges. Highly preferred compositions also contain one or more of a cationic coagulant aid, especially chitosan, a microbiocidal disinfectant, a water-soluble alkali, a water-insoluble silicate, and a food additive or nutrient source.

U.S. Pat. No. 5,543,056, issued to Murcott et al., discloses a method for treating water using natural polymers that provide an alternate and improved means to achieve enhanced coagulation is described. A method for removing particles, color, and color from drinking water, comprising adding a primary coagulant such as a natural, cationic polymer like chitosan or a cationic starch and a coagulant aid such as bentonite to drinking water to form a mixture. A preferred concentration weight ratio of natural polymer to clay mineral is between 1:5 and 1:20. A composition for removing particles and color from drinking water is described that includes a natural, cationic polymer coagulant and clay mineral in a total amount effective to coagulate suspended material in the drinking water. The composition includes a weight ratio natural polymer coagulant/clay mineral of between about 1:5 to about 1:20.

U.S. Pat. No. 6,652,893, issued to Berson, discloses an enclosed tank with a water inlet, a water outlet, an air inlet, and an air outlet. A flavor additive cartridge is attached in-line with the air inlet. It evaporates flavoring or other additives into the air inlet. Water is forced to flow turbulently through the tank. Simultaneously air is pumped through the tank via the additive cartridge. Turbulence induced in the water encourages pollutant gases dissolved in the water to transfer to the pumped air and then to exit the air outlet. It also encourages flavoring and/or homeopathic medicine in the additive cartridge to dissolve from the pumped air into the water. Water pressure is provided externally to the invention, such as by a water utility or house water pump. The water level in the tank is stabilized by controlling the air pressure in the tank, via various alternative means.

U.S. Patent Application Publication No.: 2008/0020096, by Blum et al., discloses a system for treating drinking water to enhance it with consumable additives such as vitamins and flavor. The system may be connectable to a source of drinking water such as home faucet, and operable to selectably introduce additives into the drinking water.

U.S. Patent Application Publication No.: 2004/0055948, by Blum et al., discloses a system for treating drinking water to enhance it with consumable additives such as vitamins and flavor. The system may be connectable to a source of drinking water such as home faucet, and operable to selectably introduce additives into the drinking water.

The inventions heretofore known suffer from a number of disadvantages which include being limited in application, being limited in versatility, being limited in adaptability, being expensive, being bulky, being cumbersome to use, being unduly complex, failing to enhance water beyond its simple state, failing to nourish, failing to provide sufficient health benefits, failing to protect from user failure, and being unsafe.

What is needed is a water enhancement system that solves one or more of the problems described herein and/or one or more problems that may come to the attention of one skilled in the art upon becoming familiar with this specification.

SUMMARY OF THE INVENTION

The present invention has been developed in response to the present state of the alt, and in particular, in response to the problems and needs in the art that have not yet been fully solved by currently available water treatment systems. Accordingly, the present invention has been developed to provide a water enhancement system configured to enhance a water supply.

In one embodiment of the invention, there is a water enhancement system coupled to a water conduit, wherein the water enhancement system is configured to enhance a water supply. The water enhancement system may include a filtration system coupled to a water conduit, configured to filter water flowing therethrough. The water enhancement system may also include an enhancement system coupled to the filtration system at a position downstream from the filtration system. The enhancement system is in fluid communication with the water conduit and configured to treat water flowing therethrough by dispensing a fluid therein. The enhancement system may include a plurality of cartridge sockets and matching cartridges configured to selectably couple together, wherein at least one cartridge socket is substantially different from another cartridge socket so that a matching cartridge is not receivable by the different cartridge socket. The plurality of cartridges may contain enhancing fluid and may be adapted to be in selectable fluid communication with the water conduit when coupled to matching cartridge sockets.

In addition, the enhancement system may further include a port disposed through the water conduit, configured to selectably incorporate nutritional supplements, vitamins, and enhancements to the water flowing therethrough. The plurality of cartridges may include a vitamin cartridge, an enhancement cartridge, and a treatment cartridge; wherein the plurality of cartridges may be selectably refillable. The plurality of cartridges may each include a flow meter; wherein the flow meter controls the amount of fluid from the cartridge is incorporated into the enhancement system and indicates the amount of fluid in the cartridge. The enhancement system may also include a safety device, configured to keep the fluid incorporated into the water from the plurality of cartridges from exceeding safety limits. Furthermore, the water enhancement system may include a treatment bracket coupled about the water conduit and to the enhancement system and configured to receive a water treatment device. Moreover, the water enhancement system may include a treatment device coupled about the treatment bracket and configured to alter a characteristic of the water flowing therethrough. The treatment device may include a magnet configured to alter the ionization and polarization of the water flowing therethrough.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
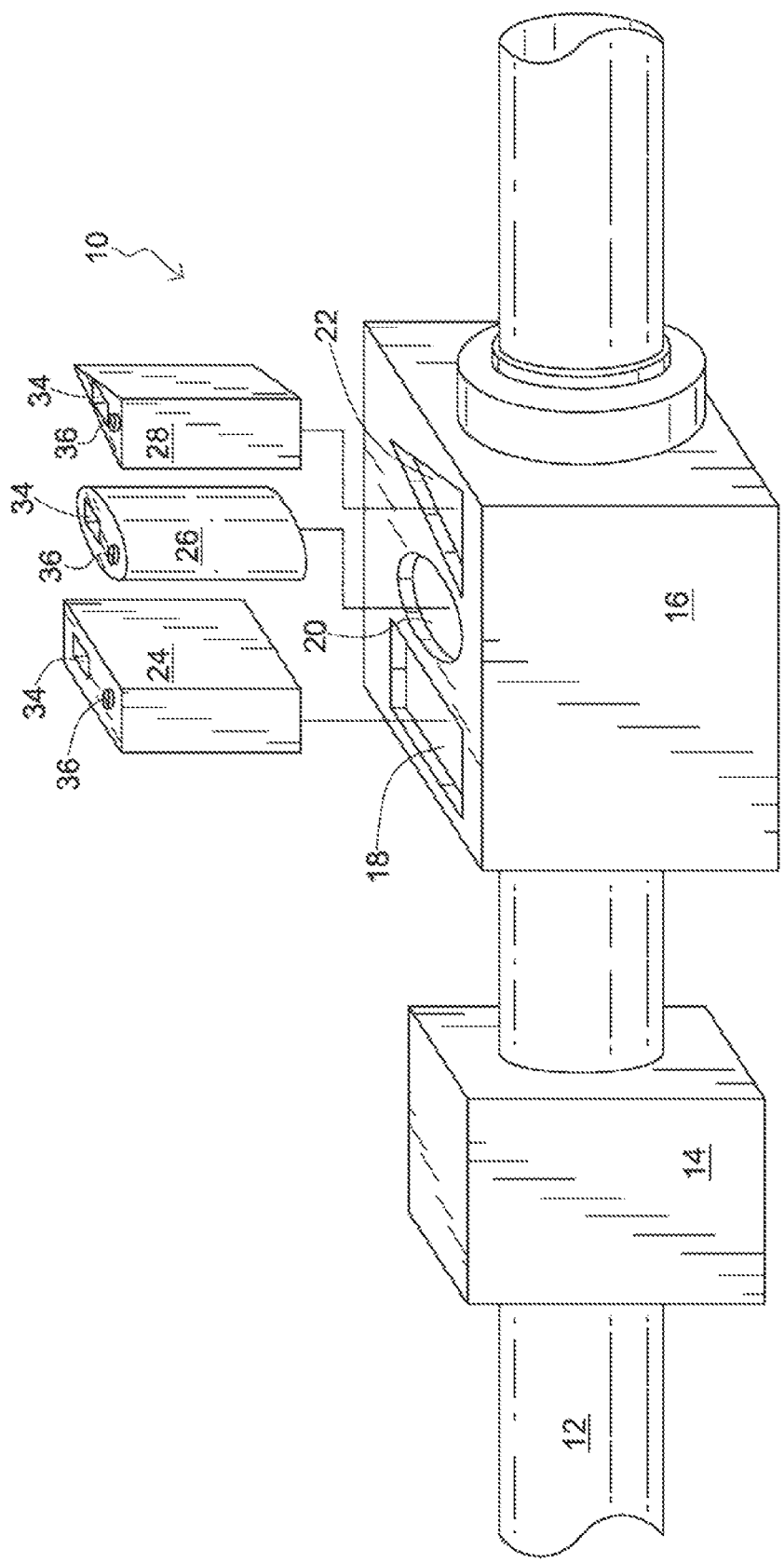
FIG. 1 is a perspective view of a water enhancement system, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a perspective view of a water enhancement system 10, according to one embodiment of the invention, wherein the water enhancement system 10 is coupled to a water conduit and configured to enhance a water supply. The illustrated water enhancement system 10 includes a filtration system 14 coupled to a water conduit 12, configured to filter water flowing therethrough. The water enhancement system 10 also includes an enhancement system 16 coupled to the filtration system 14 at a position downstream from the filtration system 14. The enhancement system 16 is in fluid communication with the water conduit 12 and configured to treat water flowing therethrough by dispensing a fluid therein.

In addition, the enhancement system 16 includes a plurality of cartridge sockets 18, 20, 22, and matching cartridges 24, 26, 28 configured to selectably couple together, wherein at least one cartridge socket is substantially different from another cartridge socket so that a matching cartridge is not receivable by the different cartridge socket. The plurality of cartridges 24, 26, 28 each contains enhancing fluid and is adapted to be in selectable fluid communication with the water conduit 12 when coupled to matching cartridge sockets 18, 20, 22. The plurality of cartridges 18, 20, 22 each includes a flow meter 34. The flow meter 34 is configured to control the amount of fluid, from the cartridge, being incorporated into the enhancement system 16, and also indicates the amount of fluid in the cartridge. The following are examples of fluid cartridge devices configured to dispense a fluid in a fluid conduit and are incorporated by reference herein for their supporting teachings: U.S. Pat. No. 6,913,168, issued to Lawson et al., U.S. Pat. No. 6,192,797, issued to Rea et al., and U.S. Pat. No. 5,341,859, issued to Howseman Jr. The enhancement system 16 also includes a safety device 36, configured to keep the fluid, incorporated into the water from the cartridge, from exceeding safety limits.

Furthermore, the enhancement system 16 is configured to enable a user to select from a plurality of enhancing fluid, such as, but not limited to vitamins, supplements, enhancements, treatments, etc. to enhance the water supply. The plurality of cartridges are configured to enable a user to combine different enhancing fluids together with water only in certain allowed combinations, such as by providing specially shaped cartridges matching specially shaped cartridge sockets, without creating an over-enhanced or otherwise undesirable treatment of the water supply. Other examples include using electronic communication between sockets and cartridges and controlling dispensing according to a protocol, using specially shaped injection nozzles configured to interoperate with socket devices configured to selectably alter injection nozzle capabilities based on cartridge combinations, and other mechanical, electrical, and chemical devices, systems, and methods for altering/restricting cartridge combinations and cartridge effectiveness based on relationships between cartridge contents. Therefore, a system may be designed such that a user may only couple specific combinations that are safe to incorporate into the water supply.

In operation of one embodiment of the invention, a user selects a combination of enhancing fluids to incorporate into a water supply. The user couples a fluid cartridge to the corresponding cartridge socket and secures the cartridge to the enhancement system. The user then couples a second cartridge and a third cartridge to the enhancement system according to a recommended combination of enhancing fluids. The user turns on the water supply and drinks enhanced water.

Figure 2:
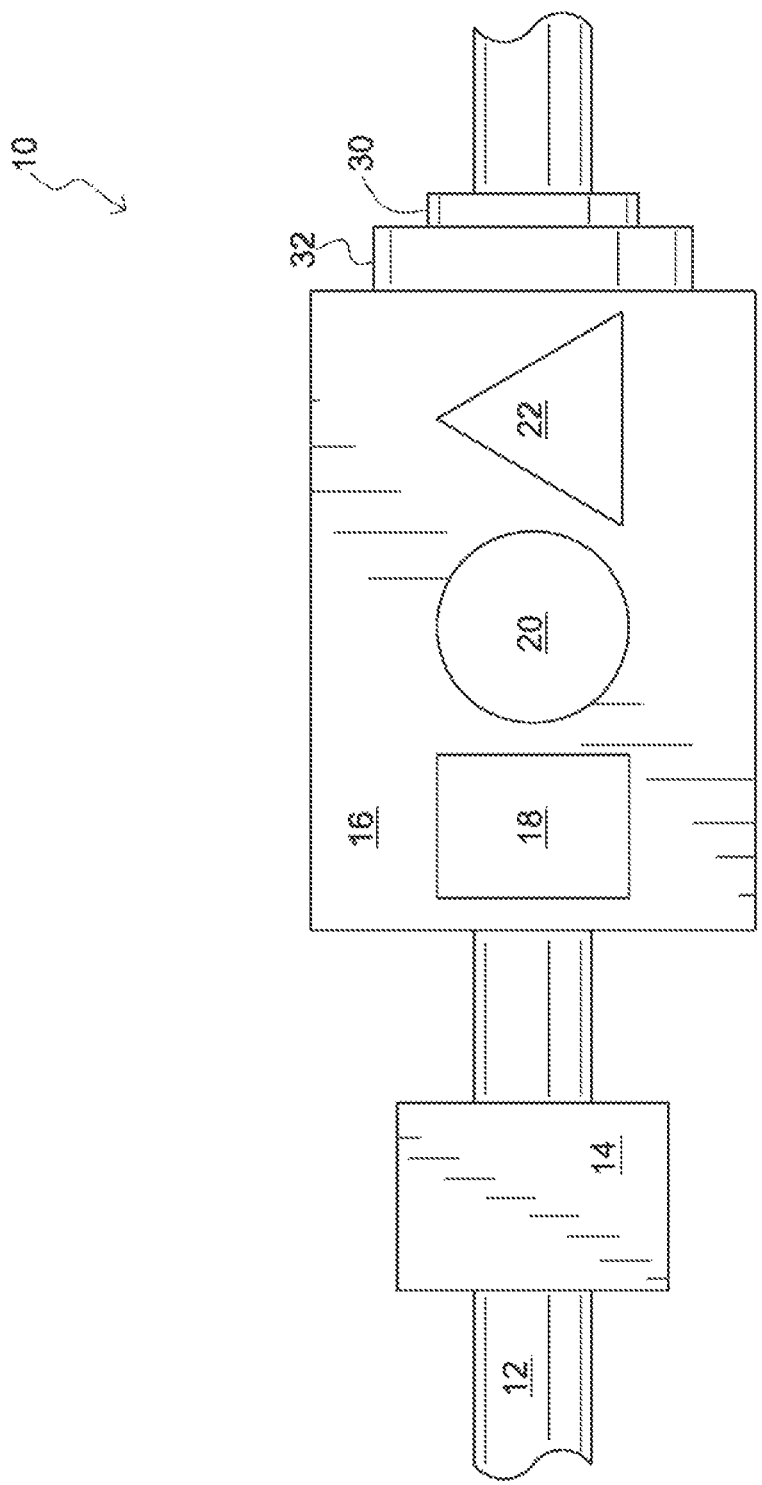
FIG. 2 is a top plan view of a water enhancement system, according to one embodiment of the invention.

FIG. 2 is a top plan view of a water enhancement system 10, according to one embodiment of the invention; wherein the water enhancement system 10 is coupled to a water conduit and configured to enhance a water supply. The illustrated water enhancement system 10 includes a filtration system 14 coupled to a water conduit 12, configured to filter water flowing therethrough. The water enhancement system 10 also includes an enhancement system 16 coupled to the filtration system 14 at a position downstream from the filtration system 14. The enhancement system 16 is in fluid communication with the water conduit 12 and configured to treat water flowing therethrough by dispensing a fluid therein. The enhancement system 16 additionally includes a plurality of cartridge sockets 18, 20, and 22. The water enhancement system 10 further includes a treatment bracket 30 coupled about the water conduit 12 and to the enhancement system 16 and configured to receive a water treatment device 32. Moreover, the water enhancement system 10 includes a water treatment device 32 coupled about the treatment bracket 30 and configured to alter a characteristic of the water flowing therethrough. In one non-limiting example the water treatment device 32 includes a magnet configured to alter the ionization and polarization of the water flowing therethrough. Other non-limiting examples include: religious tokens, devices for driving a current or holding a voltage differential across a portion of the conduit or fluid therein, and other devices for altering a characteristic of the fluid such that one may indicate that the fluid has been so treated/blessed/aligned/etc. The following examples of water treatment devices are incorporated herein for their supporting teachings: U.S. Pat. No. 5,556,654, issued to Fregeau, U.S. Pat. No. 4,605,498, issued to Kulish, and U.S. Pat. No. 6,602,411, issued to Aida et al.

In operation of one embodiment of the illustrated invention, a user selects a combination of enhancing fluids to incorporate into a water supply. The user couples a fluid cartridge, a second cartridge, and a third cartridge to the corresponding cartridge sockets and secures the cartridges to the enhancement system. The water flowing through the enhancing system passes through the water treatment device, thereby treating the ionization and polarization of the water with a magnet. The user turns on the water supply and drinks enhanced and treated water.

Figure 3:
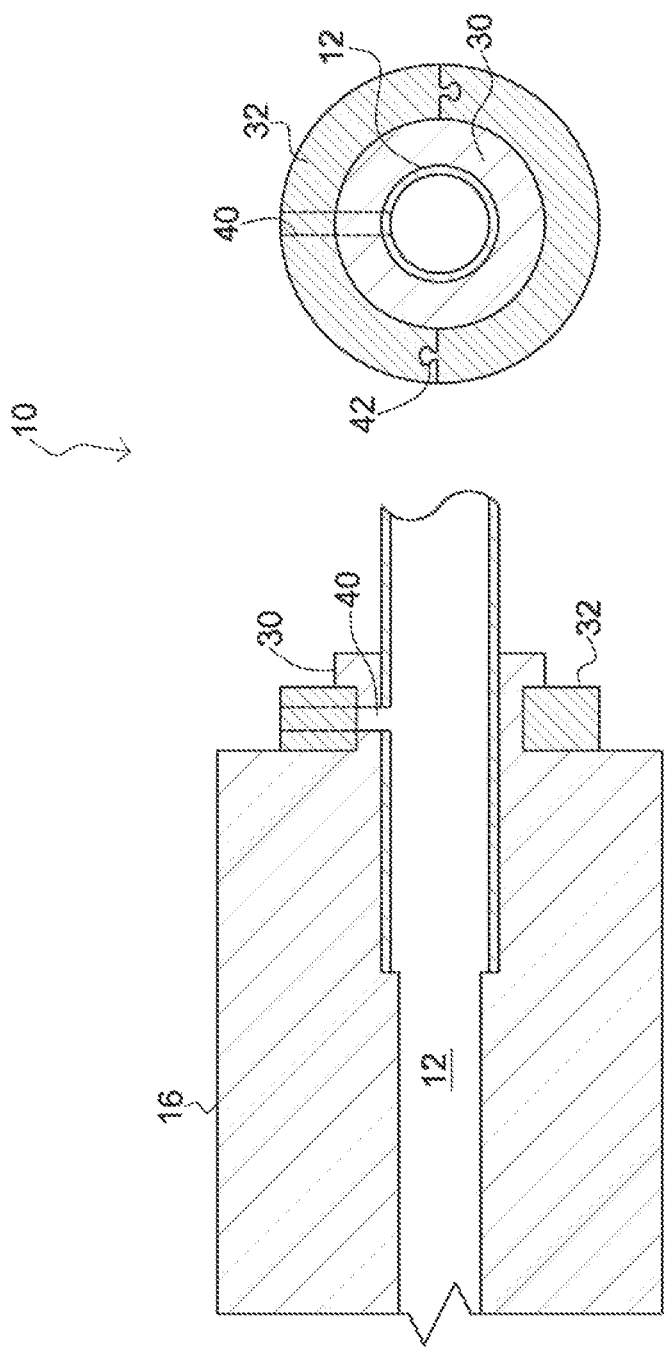
FIG. 3 is a cross sectional view of a water enhancement system, according to one embodiment of the invention.

FIG. 3 is a cross sectional view of a water enhancement system 10, according to one embodiment of the invention; wherein water enhancement system 10 is coupled to a water conduit 12. The water enhancement system 10 includes an enhancement system 16 coupled to the water conduit 12, wherein the enhancement system 16 is in fluid communication with the water conduit 12 and configured to treat water flowing therethrough by dispensing a fluid therein. The enhancement system 16 includes a port 40 disposed through the water conduit 12, configured to selectably incorporate nutritional supplements, vitamins, and enhancements to the water flowing therethrough. In addition, the water enhancement system 10 includes a treatment bracket 30 coupled about the water conduit 12 and to the enhancement system 16 and configured to receive a water treatment device 32. Furthermore, the water enhancement system 10 includes a treatment device 32 coupled about the treatment bracket 30 and configured to alter a characteristic of the water flowing therethrough. The treatment device 32 includes a magnet configured to alter the ionization and polarization of the water flowing therethrough. As illustrated in FIG. 3, the treatment device includes a tongue and groove coupling device 42, configured to couple the treatment device to the treatment bracket.

In operation of one embodiment of the invention, a user selects a combination of enhancing fluids to incorporate into a water supply. The user couples a fluid cartridge, a second cartridge, and a third cartridge to the corresponding cartridge sockets and secures the cartridges to the enhancement system. The water flowing through the enhancing system passes through the water treatment device, thereby treating the ionization and polarization of the water with a magnet. In addition, the user may selectably incorporate nutritional supplements, vitamins, and enhancements to the water supply through the port. The user turns on the water supply and drinks enhanced and treated water.

Figure 4:
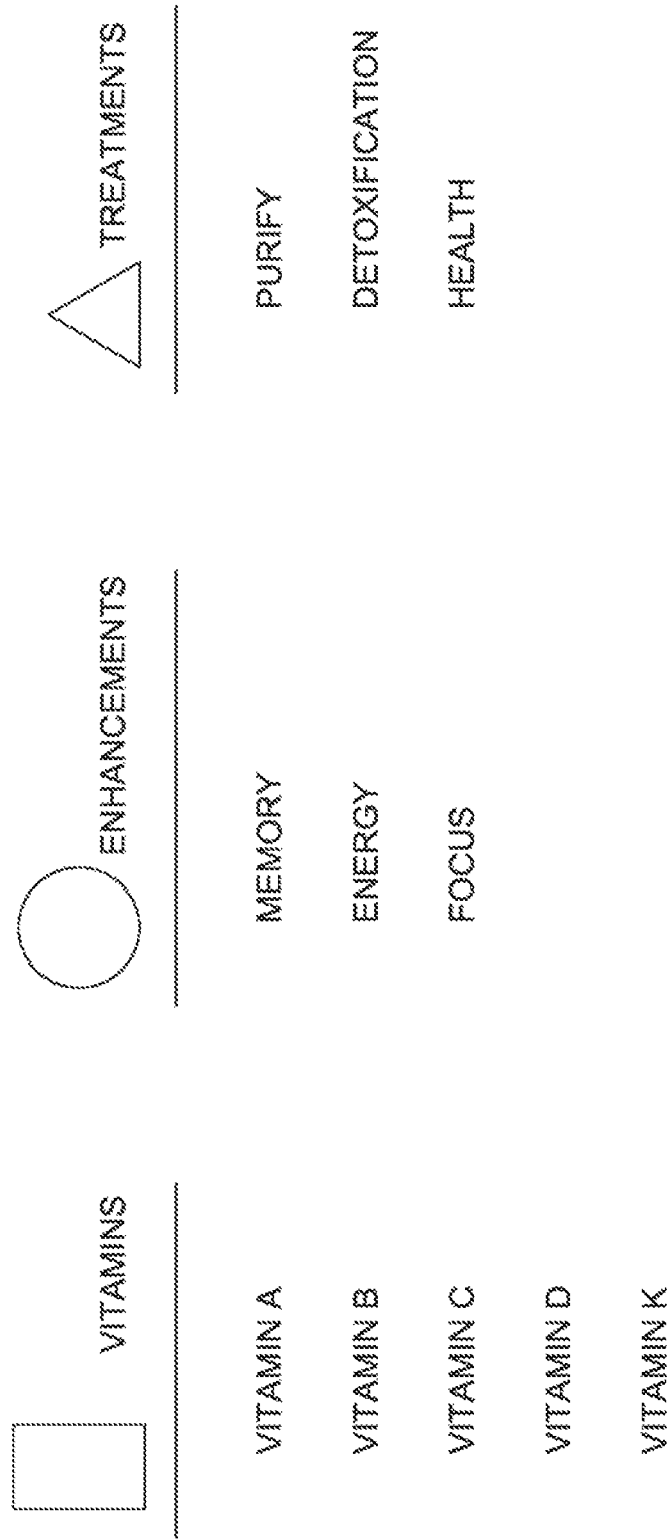
FIG. 4 is a chart of prophetic exemplary combinations of fluids for the plurality of cartridges of the enhancement system of the water enhancement system, according to one embodiment of the invention.

FIG. 4 is a graphical representation of the combinations of fluids for the plurality of cartridges of the enhancement system of the water enhancement system, according to one embodiment of the invention. A user may select from a plurality of vitamins, wherein the vitamins are contained in fluid form within a fluid cartridge. The vitamin cartridges are configured, so that a user can not receive an undesired dosage of vitamins incorporated into the water supply through the enhancement system. In addition, the user may select from a plurality of enhancements, wherein the enhancements are contained in fluid form within a fluid cartridge. The enhancement cartridges are configured, so that a user can not receive an undesired dosage of enhancements incorporated into the water supply through the enhancement system. Furthermore, the user may select from a plurality of treatments, wherein the treatments are contained in fluid form within a fluid cartridge. The treatment cartridges are configured, so that a user can not overdose on treatments incorporated into the water supply through the enhancement system. The water enhancement system is configured to enable a user to select from a plurality of enhancing fluid, such as, but not limited to vitamins, supplements, enhancements, treatments, etc. to enhance the water supply. The plurality of cartridges is configured to enable a user to combine different enhancing fluids together with water, without creating an over-enhanced water supply. In one embodiment, vitamins may include vitamin supplements according to standard usage, enhancements may include energy enhancements such as ginseng and/or caffeine, and treatments may include water soluble herbal supplements. Accordingly, one can readily see that it would be undesirable to have too high a dosage permitted for caffeine and/or other additions to the water and that the illustrated invention may be utilized to prevent such from occurring by accident. More, the different cartridge types may be organized in any way conducive to achieving goals of safety, treatment of health issues, protecting the public, promoting growth and health, and marketing. Therefore, it is advantageous that the user can only couple specific combinations into the water supply according to the restrictions of the system/device and according to an established cartridge system.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a water enhancement system coupled to a water conduit. One skilled in the art would appreciate that the water enhancement system may be portable, wherein the water enhancement system is configured to couple to any water supply, such as, but not limited to a garden hose, a water container, a liver, a lake, a pond, etc, and still perform its intended function.

Additionally, although the figures illustrate a rectangular cartridge, a circular cartridge, and a triangular cartridge; one skilled in the art would appreciate that the cartridges may vary in size, shape, configuration, design, length, height, width, color, and still perform its intended function.

It is also envisioned that the plurality of cartridges and the plurality of cartridge sockets may vary in number, size, shape, configuration, design, length, height, width, color, and still perform its intended function.

It is expected that there could be numerous variations of the design of this invention. An example of a variation that one skilled in the rut would appreciate may be the filter system is incorporated into the enhancement system, and still perform its intended function.

Finally, it is envisioned that the components of the device may be constructed of a variety of materials, such as, but not limited to metal, metal alloys, plastic, plastic composites, lubber, rubber composites, textiles, etc. and still perform its intended function.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A water enhancement system coupled to a water conduit and configured to enhance a water supply, comprising:

a) a filtration system coupled to a water conduit, configured to filter water flowing therethrough;

b) an enhancement system coupled to the filtration system at a position downstream from the filtration system, in fluid communication with the water conduit and configured to treat water flowing therethrough by dispensing a fluid therein and including a plurality of cartridge sockets and matching cartridges configured to selectably couple together, wherein at least one cartridge socket is substantially different from another cartridge socket so that a matching cartridge is not receivable by the different cartridge socket, wherein the plurality of cartridges contain enhancing fluid and are adapted to be in selectable fluid communication with the water conduit when coupled to matching cartridge sockets;

c) a treatment bracket coupled about the water conduit and to the enhancement system and configured to receive a water treatment device; and d) a treatment device coupled about the treatment bracket and configured to alter a characteristic of the water flowing therethrough.

2. The water enhancement system of claim 1, wherein the enhancement system further includes a port disposed through the water conduit, configured to selectably incorporate nutritional supplements, vitamins, and enhancements to the water flowing therethrough.

3. The water enhancement system of claim 1, wherein the plurality of cartridges includes a vitamin cartridge.

4. The water enhancement system of claim 1, wherein the plurality of cartridges includes an enhancement cartridge.

5. The water enhancement system of claim 1, wherein the plurality of cartridges includes a treatment cartridge.

6. The water enhancement system of claim 1, wherein the plurality of cartridges are selectably refillable.

7. The water enhancement system of claim 1, wherein the plurality of cartridges each include a flow meter; wherein the flow meter controls the amount of fluid from the cartridge is incorporated into the enhancement system and indicates the amount of fluid in the cartridge.

8. A water filter kit configured to enhance a water supply, comprising:

a) a filtration system coupled to a water supply, configured to filter water flowing therethrough;

b) an enhancement system coupled to the filtration system at a position downstream from the filtration system, in fluid communication with the water supply and configured to treat water flowing therethrough by dispensing a fluid therein and including a plurality of cartridge sockets and matching cartridges configured to selectably couple together, wherein at least one cartridge socket is substantially different from another cartridge socket so that a matching cartridge is not receivable by the different cartridge socket, wherein the plurality of cartridges contain enhancing fluid and are adapted to be in selectable fluid communication with the water supply when coupled to matching cartridge sockets;

c) a treatment bracket coupled about the water supply and to the enhancement system and configured to receive a water treatment device; and d) a treatment device coupled about the treatment bracket and configured to alter a characteristic of the water flowing therethrough.

9. The water filter kit of claim 8, wherein the enhancement system further includes a port disposed through the water supply, configured to selectably incorporate nutritional supplements, vitamins, and enhancements to the water flowing therethrough.

10. The water filter kit of claim 9, wherein the plurality of cartridges includes a vitamin cartridge.

11. The water filter kit of claim 10, wherein the plurality of cartridges includes an enhancement cartridge.

12. The water filter kit of claim 11, wherein the plurality of cartridges includes a treatment cartridge.

13. The water filter kit of claim 12, wherein the plurality of cartridges are selectably refillable.

14. The water filter kit of claim 13, wherein the plurality of cartridges each include a flow meter; wherein the flow meter controls the amount of fluid from the cartridge is incorporated into the enhancement system and indicates the amount of fluid in the cartridge.

15. The water filter kit of claim 14, wherein the treatment device includes a magnet configured to alter the ionization and polarization of the water flowing therethrough.

\* \* \* \* \*